March 31, 1931. A. G. SIEBENLIST 1,798,957
MACHINE FOR COPING CORNER BEADS
Filed Oct. 26, 1927
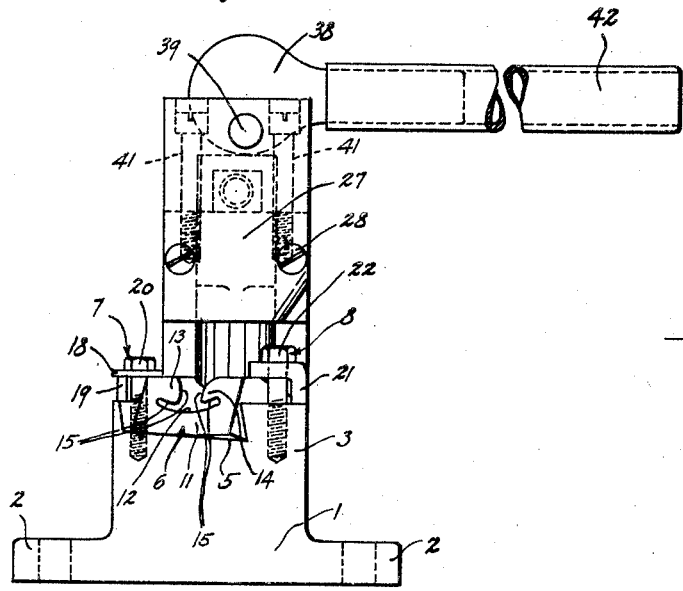
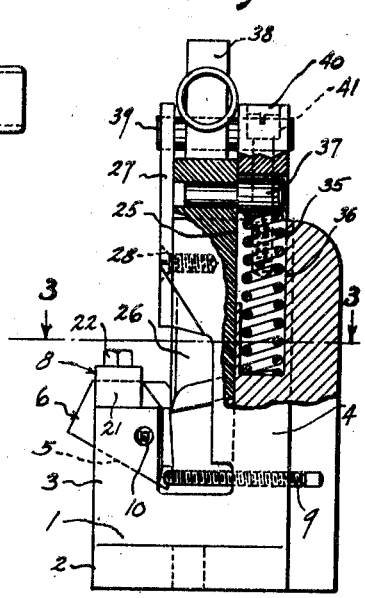
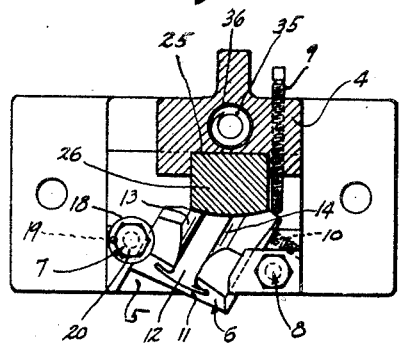
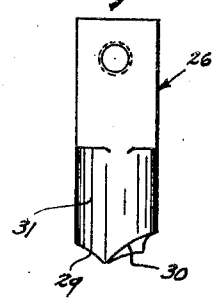
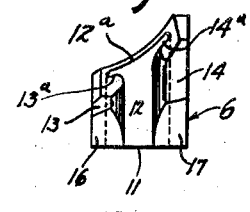
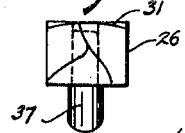
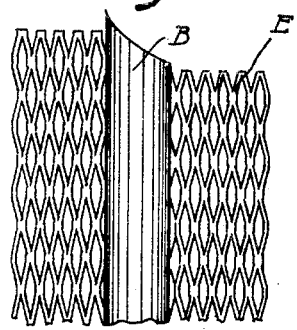
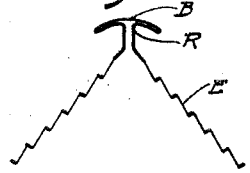
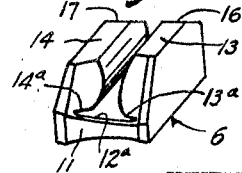
INVENTOR
Anthony G. Siebenlist
BY
ATTORNEY Patented Mar. 31, 1931

1,798,957

UNITED STATES PATENT OFFICE

ANTHONY GEORGE SIEBENLIST, OF MILWAUKEE, WISCONSIN, ASSIGNOR, BY MESNE ASSIGNMENTS, TO MILCOR STEEL COMPANY, OF MILWAUKEE, WISCONSIN, A CORPORATION OF DELAWARE

MACHINE FOR COPING CORNER BEADS

Application filed October 26, 1927. Serial No. 228,707.

This invention relates to a machine for coping corner bead or the like and especially the so-called "bull nose" corner bead, although also equally well adapted for use with other similar or diverse articles or structures.

"Bull nose" corner bead has a rounded outer body plate and reversely bent wings along the edge of the body plate, the wings usually having portions of expanded metal.
When this beading is used in a rectangular opening such as a door, window, or the like, the problem of properly fitting the ends of the bead is one that has caused considerable annoyance and it has been very difficult to obtain a proper, well appearing interfit between the bead at the corners of the opening. This problem has been aggravated by the fact that the body plate of the bead is curved and is located at an angle across the edge of the opening along which it extends, this formation and arrangement of the corner bead making it impossible to miter the corners in the usual manner as one end of each bead must be cut along curved lines to fit over the angularly curved body plate of the other.

One object of the present invention is to provide a machine which may be easily and conveniently operated to so cut an end of a piece of corner bead as to adapt it for snug interfit with another piece of corner bead at the corner of an opening, or the like, the machine cutting the body plate and wings of the bead along the proper curved lines and with the proper bevel to accomplish this purpose.

Another object of the invention is to provide a machine of this character which is of simple and durable construction, reliable and effective in operation, and easily and comparatively inexpensive to manufacture, and which properly holds the body portion and wings of the bead during the cutting operation and cuts the same with a shearing instead of a tearing action thereby obtaining a clean and smooth cut.

Other objects and advantages reside in certain novel features of the construction, arrangement and combination of parts which is hereinafter more fully described and particularly pointed out in the appended claims, reference being had to the accompanying drawings, forming a part of this specification, and in which:

Figure 1 is a view in front elevation showing a machine embodying the present invention;

Figure 2 is a view in side elevation with parts broken away and parts shown in vertical section, further illustrating the machine shown in Figure 1;

Figure 3 is a sectional view on line 3—3 of Figure 2;

Figures 4 and 5 are detail views in front elevation and bottom plan, respectively, showing the construction of the sliding knife;

Figures 6 and 7 are detail views in top plan and front elevation, respectively, showing the construction of the fixed knife;

Figure 8 is a detail perspective view further illustrating the fixed knife;

Figure 9 is a view in front elevation of one form of "bull nose" corner bead adapted to be cut in the present machine; and Figure 10 is a diagrammatic view thereof in end elevation.

Referring to the drawings, numeral 1 designates a suitable base having apertured lugs 2 to adapt it to be fastened to a work bench or other suitable supporting structure. The base 1 has an integral knife seat 3 at one side and an integral standard 4 opposite the knife seat.

The knife seat 3 is provided with a slot 5 which extends at an angle across the knife seat, the slot 5 being inclined both with respect to the horizontal and to the vertical.

A combined fixed knife and work holder designated generally at 6 is fitted in the slot 5 and is held in adjusted position in the slot 5 of the knife seat by means of clamping devices 7 and 8, a stop screw 9 and a lock screw 10. As shown, the combined fixed knife and work holder 6 is provided with a body portion 11 having a curved upper surface 12 and is also provided with marginal flanges 13 and 14 along the edges of the body portion, the marginal flanges 13 and 14 overlying the curved surface 12 of the body portion and being provided with curved surfaces 15 designed to snugly engage the reversely bent wings of the corner bead. The body portion

11 and the flanges 13 and 14 are formed with cutting edges designated at 12ª, 13ª and 14ª and these cutting edges are inclined in the assembly to give the proper curve and bevel to the corner bead. As shown in Figure 3, the inner face or the knife portion of the member 6 on which the cutting edges are formed is rounded or concave. The tops of the flanges 13 and 14 are provided with flats 16 and 17 to adapt them to have secure clamping engagement with the clamping means 7 and 8. The clamping means 7 may comprise a washer 18 forced down against the flat 16 and against a pin 19 by means of a stud bolt 20 threaded into the knife seat while the clamping means 8 may comprise an angular clamping lug 21 having a leg engaged with the knife seat and a leg engaged with the flat 17, the legs being forced into engagement with these parts by means of a stud bolt 22 threaded into the knife seat. As clearly shown in Figures 2 and 3 the stops screw is threaded through the lower end of the standard 4 and has its inner end rounded to engage the forward and lower portion of the body 11 of the knife. The lock screw 10 is threaded through an opening provided therefor in the knife seat and has binding engagement with one side of the fixed knife.

The standard 4 is provided with a vertical guide-way 25 to receive a sliding knife 26, held in the guide-way by means of a removable front plate 27 attached by screws 28 to the standard. The lower end of this knife 26 is provided with cutting edges 29 and 30 of pointed or approximately V-shaped formation. These cutting edges are formed on a rounded or convex surface 31 of the knife which corresponds to the curvature of the inner face of the fixed knife on which the cutting edges 12ª, 13ª and 14ª are formed.

The sliding knife 26 is biased to its upper position with its lower end above the fixed knife by means of a compression coil spring 35 received in a socket 36 provided in the standard 4 and engaging a projection 37 carried by the sliding knife 26. For forcing the knife 26 downwardly a cam 38 is provided and engages the upper end of the knife. This cam 38 is rotatably mounted on a shaft 39 secured in the plate 27 and in a bearing block 40 secured by screws 41 to the standard 4. A handle 42 is provided for operating the cam.

Figures 9 and 10 show one form of "bull nose" corner bead which may be coped in the hereinabove machine and, as shown, this corner bead has a curved outer nose or body plate B, and reversely bent wings R having portions E of expanded metal.

In coping a piece of corner bead of this character the expanded metal portions E of the wing adjacent the end to be coped must be cut away slightly with shears. This end portion is then inserted in the fixed knife of the machine, the body plate B resting against the curved surface 12 of the body of the fixed knife and the reversely bent wing portions R being snugly engaged by the flanges 13 and 14. With the parts so positioned the operator grasps the handle 42 and rotates the cam 38 to cause the cam 38 to force the knife 26 downwardly. As the knife 26 moves downwardly its pointed or V-shaped end enters in between the wings R, and then the edges 29 and 30 of the movable knife coact with the edges 13ª and 14ª of the fixed knife to shear off the wings R. As the downward movement of the sliding knife 26 progresses further, the point at the lower end of the knife penetrates the central portion of the body plate B and thereafter the edges 29 and 30 continue the cutting of the body plate B with a shearing action due to the coaction of these cutting edges 29 and 30 with the cutting edge 12ª of the fixed knife. This completes the coping of the corner bead. During the entire cutting action, the body portion and the flanges of the fixed knife engage and hold the bead to prevent deformation thereof. Upon reverse movement of the handle 42 the spring 35 moves the knife to its uppermost position.

Proper clearance between the fixed and sliding knives may be had by adjusting the fixed knife. Such adjustment of the fixed knife is carried out by releasing the studs 20 and 22 and the lock screw 10 and then advancing or backing off the stop screw 9, after which the clamping means and the lock screw are tightened up.

While the machine is especially designed for use with "bull nose" corner bead it is not restricted to this use but may be adapted and applied to various other similar or diverse uses.

The invention claimed is:

1. A machine for coping a "bull nose" corner bead including a fixed knife having a curved body adapted to fit snugly against the curved outer surface of the corner bead and curved marginal flanges overlying the curved body and shaped to engage the reversely bent wings of the bead and having means for holding the bead at an acute angle with respect to the cutting edges of the fixed knife, and a movable knife cooperable with the fixed knife.

2. A machine for coping a "bull nose" corner bead including a fixed knife flanged to embrace and hold the corner bead and a movable knife cooperable with the fixed knife and adapted to move along a line making an acute angle with respect to the longitudinal axis of the fixed knife.

3. A machine for coping "bull nose" corner beads including a fixed knife having a curved body adapted to fit snugly against the curved outer surface of the corner bead and curved flanges overlying the curved body and shaped to engage the reversely bent wings of the beads, said body and flanges having cutting edges, and a movable knife having cooperable cutting edges of substantially V-shaped formation.

4. A machine for coping corner bead having a rounded outer surface, comprising a combined fixed knife and bead holder, means for supporting the combined fixed knife and bead holder in an inclined position and a sliding knife cooperable with the fixed knife, said knives being shaped to cut the bead along a curved line, the inclination of the combined fixed knife and work holder giving the proper coping angle to the cut.

5. A machine for coping corner bead having a rounded outer surface and wings, comprising a fixed knife having a body portion to engage the rounded outer surface of the bead and having flanges to engage the wings thereof, the body portion and flanges of the fixed knife terminating at one end in a curved surface formed with cutting edges inclined with respect to the longitudinal axis of the fixed knife, and a movable knife coacting with the fixed knife and having a rounded surface formed with cutting edges.

6. A machine for coping corner bead having a rounded outer surface and wings, comprising a fixed knife having a body portion to engage the rounded outer surface of the bead and having flanges to engage the wings thereof, the body portion and flanges of the fixed knife terminating at one end in a curved surface formed with cutting edges inclined with respect to the longitudinal axis of the fixed knife and a movable knife coacting with the fixed knife and having its lower end of pointed formation, curved to correspond with the curvature of the fixed knife, and formed with cutting edges cooperable with the cutting edges of the fixed knife.

7. A machine for coping corner bead including a base provided with an inclined knife seat, a fixed knife supported on said seat and including a body portion having flanges adapted to engage and hold the corner bead, the body portion and flanges of the fixed knife having rounded surfaces formed with cutting edges, a sliding knife, means for supporting the sliding knife for cooperative movement with respect to the fixed knife, said sliding knife having a rounded surface and cutting edges cooperable with the cutting edges of the fixed knife and means for operating the sliding knife.

8. A machine for coping a corner bead comprising a combined fixed knife and bead holder and a movable knife adapted to move across the edges of the fixed knife, said combined fixed knife and bead holder being adapted to hold the bead at an acute angle with respect to the cutting edges of the fixed knife and at an acute angle with respect to the line of movement of the movable knife.

9. A machine for coping a corner bead of the type having wings comprising a pair of knives, and means for holding the bead in a definite angular position with respect to the cutting edges of the knives, the shape of the knives and the positioning of the bead being such that one of the wings of the bead is cut shorter than the other.

In witness whereof, I hereto affix my signature.

ANTHONY GEORGE SIEBENLIST.